United States Patent [19]

Ubukata

[11] Patent Number: 5,053,865
[45] Date of Patent: Oct. 1, 1991

[54] PICTURE-QUALITY IMPROVING CIRCUIT

[75] Inventor: Tsuneo Ubukata, Yokohama, Japan

[73] Assignee: Victor Company of Japan, Ltd., Yokahama, Japan

[21] Appl. No.: 561,650

[22] Filed: Aug. 2, 1990

Related U.S. Application Data

[62] Division of Ser. No. 344,874, Apr. 28, 1989.

[30] Foreign Application Priority Data

Apr. 30, 1988 [JP] Japan .................................. 63-107841
Jun. 24, 1988 [JP] Japan .................................. 63-156089

[51] Int. Cl.$^5$ .............................................. H04N 9/64
[52] U.S. Cl. ...................................................... 358/37
[58] Field of Search ............................... 358/37, 21 R

[56] References Cited

U.S. PATENT DOCUMENTS

| | | | |
|---|---|---|---|
| 4,316,215 | 2/1982 | Yasumoto et al. | 358/37 |
| 4,504,853 | 3/1985 | Faroujda | 358/37 |
| 4,553,157 | 11/1985 | Hurst et al. | 358/37 |
| 4,626,891 | 12/1986 | Achiha | 358/21 R |
| 4,707,732 | 11/1987 | Matono et al. | 358/31 |
| 4,862,271 | 8/1989 | Smith et al. | 358/37 |

FOREIGN PATENT DOCUMENTS

| | | | |
|---|---|---|---|
| 55-127786 | 10/1980 | Japan | 358/37 |
| 55-127787 | 10/1980 | Japan | 358/37 |

Primary Examiner—John W. Shepperd
Attorney, Agent, or Firm—Lowe, Price, LeBlanc, Becker & Shur

[57] ABSTRACT

In a picture-quality improving circuit, a luminance transition is detected on the basis of a luminance signal. Chroma edge characteristics of a color signal are enhanced in accordance with the detected luminance transition. A detection is made as to whether the color signal and the luminance signal are correlated or uncorrelated in transition. When the color signal and the luminance signal are uncorrelated in transition, the enhancement of the chroma edge characteristics of the color signal is interrupted.

2 Claims, 5 Drawing Sheets

Y,C CORRELATED

S6

S9a

S6a

S11c

Y,C UNCORRELATED

S6

S9a

S6a

S11c

PICTURE-QUALITY IMPROVING CIRCUIT

This application is a division of Application Ser. No. 07/344,874 filed Apr. 28, 1989.

BACKGROUND OF THE INVENTION

1. Field of the Invention

This invention relates to a picture-quality improving circuit usable in various systems such as television systems or video systems.

2. Description of the Prior Art

There is a recognized need to sharpen the images of television signals, particularly at transition edges where the picture changes brightness or color, or both brightness and color. In television signal formats such as NTSC and PAL, the color information is encoded on a subcarrier which is interleaved with the baseband luminance information. An inherent drawback of these formats is the limited bandwidth for the color information component, called "chroma" or "chrominance".

There are many chances in a color television system for the chroma information to become degraded, particularly at transitions from one hue to another.

U.S. Pat. No. 4,504,853 discloses a color demodulation of the chroma subcarrier. The system of U.S. Pat. No. 4,504,853 includes an input, a delay match for delaying a modulated subcarrier signal by a predetermined amount, a one-half period delay for delaying the modulated subcarrier signal by half the period thereof, and a first adder for combining in equal amounts the undelayed modulated subcarrier with the signal delayed by the one-half period delay to provide a transition envelope. A control generator receives the luminance signal and derives a control signal from transitions occurring in the luminance. A multiplier multiplies the transition envelope signal by the control signal to provide an enhancement product. A second adder combines the delay matched modulated subcarrier in phase with the enhancement product to put out the enhanced modulated subcarrier characterized by shortened transitions in alignment with simultaneous transitions in the baseband.

Since the system of U.S. Pat. No. 4,504,853 uses a correlation between the color signal and the luminance signal in improving the transition characteristics of the color signal, the intended effect is realized when the color signal actually correlates to the luminance signal. In the system of U.S. Pat. No. 4,504,853, when the luminance signal and the color signal are uncorrelated and the color signal changes at a point near a change of the luminance signal, the edge information of the color signal is easily modulated with the edge information of the luminance signal so that the color signal tends to be contaminated by false edge information.

SUMMARY OF THE INVENTION

It is an object of this invention to provide an excellent picture-quality improving circuit.

In a picture-quality improving circuit of this invention, a luminance transition is detected on the basis of a luminance signal. Chroma edge characteristics of a color signal are enhanced in accordance with the detected luminance transition. A detection is made as to whether the color signal and the luminance signal are correlated or uncorrelated in transition. When the color signal and the luminance signal are uncorrelated in transition, the enhancement of the chroma edge characteristics of the color signal is interrupted. The disclosure of application Ser. No. 07/344,874, Filed on Apr. 28, 1989 in its entirety is incorporated herein by reference.

BRIEF DESCRIPTION OF THE DRAWINGS

FIG. 2 is a timing diagram showing the waveforms of various signals in the logic circuit of FIG. 13 which occur when the luminance signal and the color signal are mutually correlated.

DESCRIPTION OF THE FIRST PREFERRED EMBODIMENT

Figure 1:
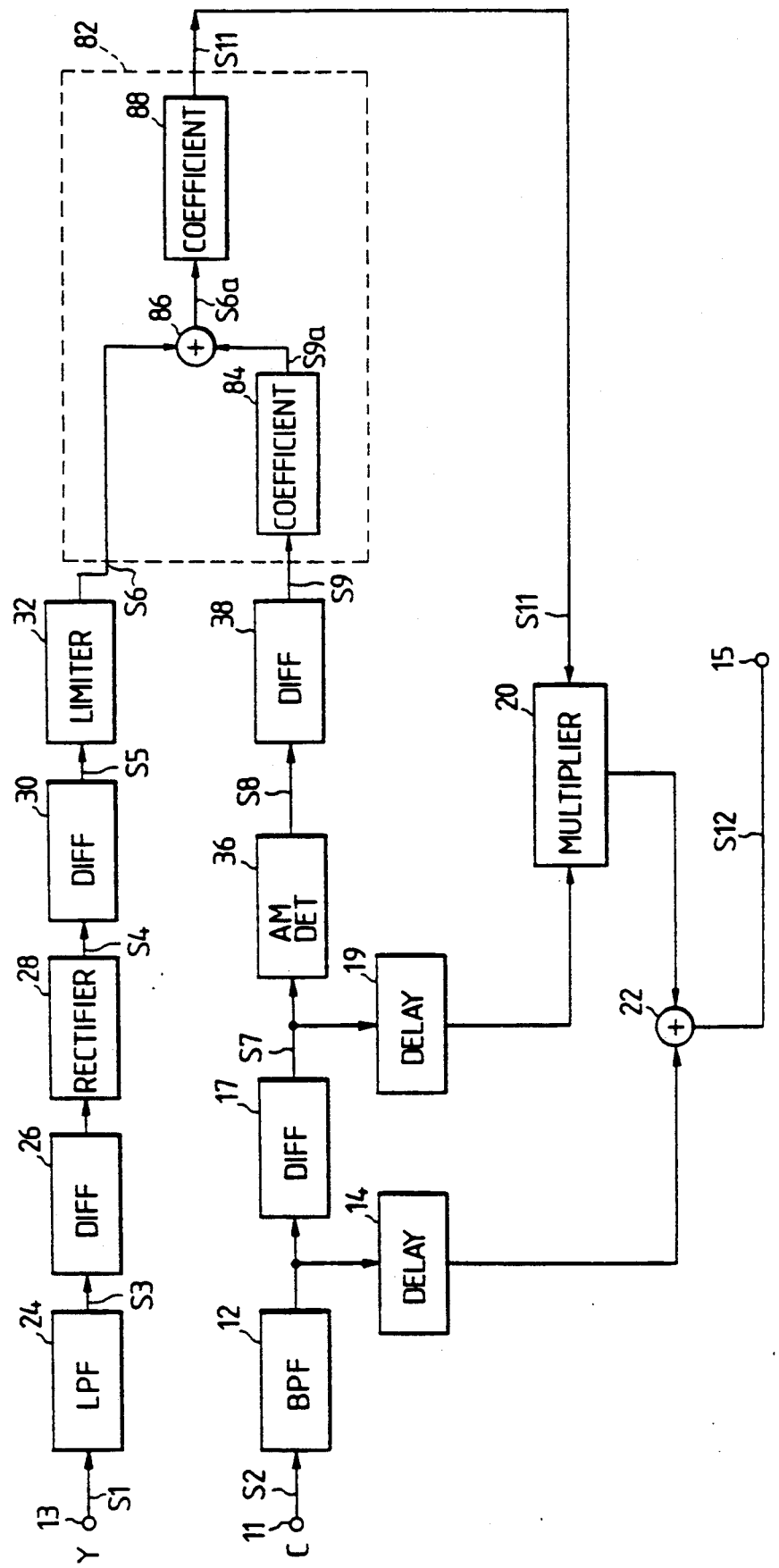
FIG. 1 is a block diagram of a picture-quality improving circuit according to a first embodiment of this invention.

With reference to FIG. 1, a luminance signal (Y signal) S1 inputted via an input terminal 13 is fed to a differentiator 26 via a low-pass filter (LPF) 24. The LPF 24 functions to remove anything but luminance transitions (luminance edges) and thereby to make those transitions very solid and well defined, free of noise and other high frequency components. The low-pass filtered luminance signal is then subjected to a first differentiation by the differentiator 26 to yield a pulse which corresponds in direction to the luminance transition. This pulse is proportional to the degree of the luminance transition. The pulse output signal from the differentiator 26 is fed to a full-wave rectifier 28. The pulse is converted by the rectifier 28 into an absolute-value pulse signal S4.

The absolute-value pulse signal S4 is passed through a differentiator 30 which yields a signal S5 representing a differential of the absolute value of the luminance transition. The waveform of the differentiated signal S5 is closely analogous to a single sinusoid having a positive-going first peak, followed by a negative-going second peak, followed by a return to the zero value. A limiter 32 connected to the differentiator 30 limits the amplitude of the double pulse differential signal S5 and thereby derives an amplitude-limited signal S6. The amplitude-limited signal is applied to a logic circuit 40.

A color signal (C signal) S2 inputted via an input terminal 11 is fed to a delay circuit 14 and a differentiator 17 via a band-pass filter (BPF) 12. The BPF 12 limits the bandwidth of the color signal S2 passed therethrough and eliminates the ringing from the color signal S2. The delay circuit 14 delays the band-pass filtered color signal so that when the delayed color signal is combined with an enhancement component later, it will be in exactly the correct phase relationship. The output signal from the delay circuit 14 is applied to a first input terminal of an adder 22.

The differentiator 17 converts the band-pass filtered color signal into a signal S7 which represents chroma transitions (chroma edges). The chroma transition signal S7 is transmitted to a first input terminal of a multiplier 20 via a phase-matching delay circuit 19. A second input terminal of the multiplier 20 receives an output signal S11 from the logic circuit 82. The multiplier 20 outputs a signal which represents a product of the delayed chroma transition signal and the output signal S11 from the logic circuit 82. The output signal from the multiplier 20 is applied to a second input terminal of the adder 22.

The adder 22 combines the output signal from the delay circuit 14 and the output signal from the multiplier 20 and thereby derives an improved color signal S12 having sharp edges.

An AM detector 36 converts the chroma transition signal S7 into a signal S8 which represents an envelope of the signal S7. The envelope signal S8 is passed through a differentiator 38 which yields a signal S9 representing a differential of the chroma transition. The waveform of the differentiated signal S9 is closely analogous to a single sinusoid having a postive-going first peak, followed by a negative-going second peak, followed by a return to the zero value. The output signal S9 from the differentiator 38 is fed to the logic circuit 82.

As shown in FIG. 1, the logic circuit 82 includes a coefficient device 84 receiving the output signal S9 from the differentiator 38. The logic circuit 82 also includes an adder 86 whose first input terminal receives the output signal S6 from the limiter 32. The coefficient device 84 includes an amplifier whose gain is chosen so that the amplitude of the amplified signal S9a approximately equals the amplitude of the signal S6 in most cases. An output signal S9a from the coefficient device 84 is fed to a second input terminal of the adder 86. The adder 86 combines the signal S6 and the signal S9a into a signal S6a which is applied to a coefficient device 88. The coefficient device 88 includes an amplifier whose gain is predetermined in correspondence with a reference coefficient. The coefficient device 88 derives a signal S11 from the signal S6a. The signal S11 is applied to the multiplier 20.

Figure 2:
FIG. 2 is a timing diagram showing the waveforms of various signals in the picture-quality improving circuit of FIG. 1 which occur when the luminance signal and the color signal are mutually correlated.
Figure 2:
Figure 2:
Figure 2:
Figure 3:
FIG. 3 is a timing diagram showing the waveforms of various signals in the logic circuit of FIG. 13 which occur when the luminance signal and the color signal are uncorrelated.
Figure 3:
Figure 3:
Figure 3:

In cases where the luminance signal S1 and the chrominance signal S2 are correlated in transition, as shown in FIG. 2, the signals S6 and S9a remain in the same polarities so that the output signals S6a and S11 from the adder 86 and the coefficient device 88 exhibit a single sinusoid at the transition.

In cases where the luminance signal S1 and the color signal S2 change at respective points close to each other but the luminance signal S1 and the color signal S2 are uncorrelated in transition, as shown in FIG. 15, during an interval at and near the point of the luminance transition, the signals S6 and S9a assume the opposite polarities respectively so that the signals S6 and S9a are mutually cancelled by the adder 86 and thus the output signal S6a from the adder 86 has small amplitudes. Accordingly, during this interval, the output signal S11 from the coefficient device 88 remains approximately at the zero potential.

DESCRIPTION OF THE SECOND PREFERRED EMBODIMENT

Figure 4:
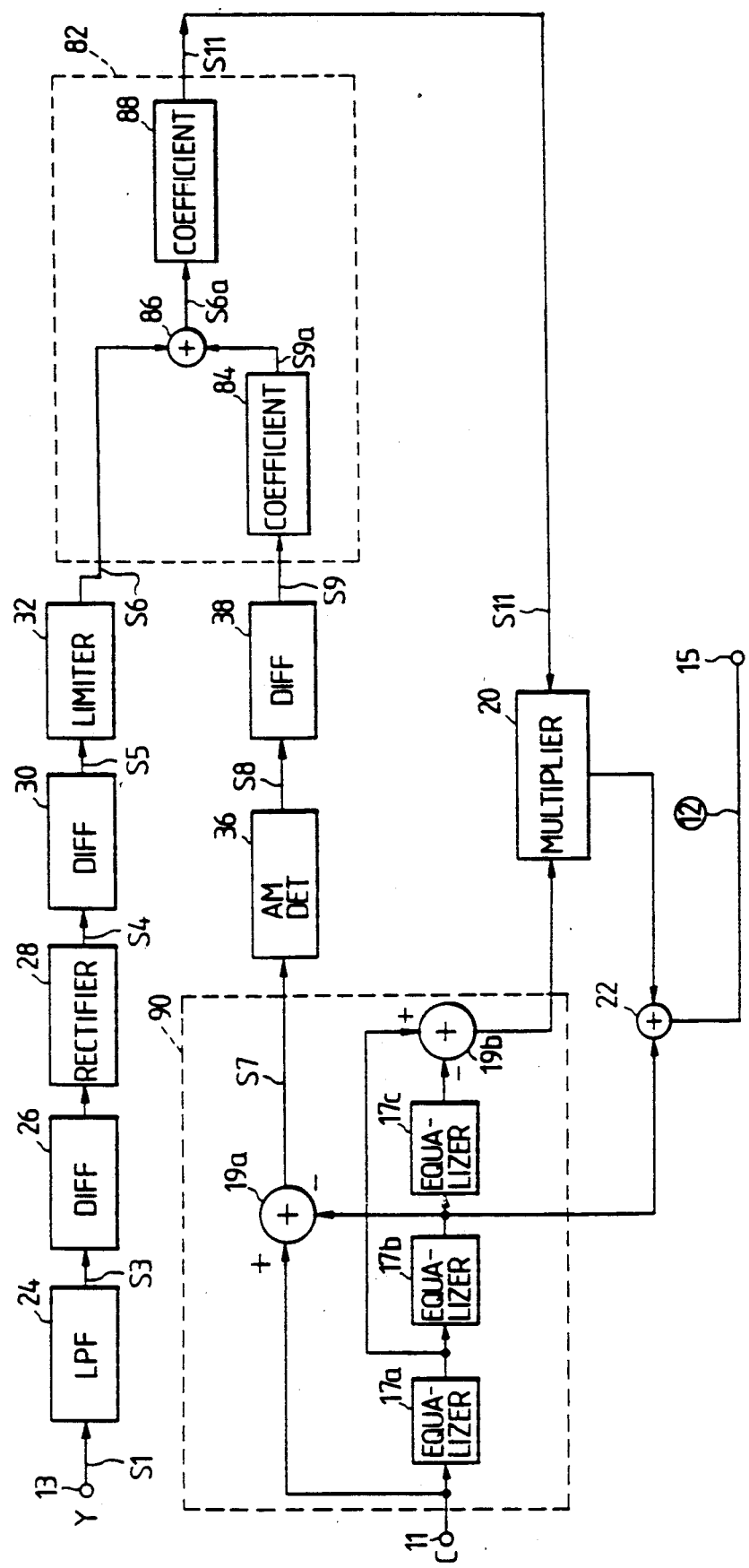
FIG. 4 is a block diagram of a picture-quality improving circuit according to a sixth embodiment of this invention.

FIG. 4 shows a sixth embodiment of this invention which is similar to the embodiment of FIG. 1 except that the combination of the devices 12, 14, 17, and 19 (see FIG. 1) is replaced by a chroma difference extractor 90.

In the embodiment of FIG. 4, the chroma difference extractor 90 receives the color signal S2 via the input terminal 11. The chroma difference extractor 90 differentiates the color signal S2 to yield a signal representing a chroma transition or a chroma edge.

The chroma difference extractor 90 has a cascade combination of equalizers 17a, 17b, and 17c, and subtracters 19a and 19b. The color signal S2 is applied to the first equalizer 17a and a first input terminal of the subtracter 19a. An output signal from the first equalizer 17a is fed to a first input terminal of the subtracter 19b and the second equalizer 17b. An output signal from the second equalizer 17b is fed to a second input terminal of the subtracter 19a and the third equalizer 17c. The output signal from the second equalizer 17b is also applied to the adder 22. An output signal from the third equalizer 17c is fed to a second input terminal of the subtracter 19b. The subtracter 19a subtracts the output signal of the second equalizer 17b from the color signal S2 and thereby differentiates the color signal S2 to yield a signal S7 representative of a chroma transition. The chroma transition signal S7 is fed to the AM detector 36. The subtracter 19b subtracts the output signal of the third equalizer 17c from the output signal of the first equalizer 17a to yield a signal which is fed to the multiplier 20.

Figure 5:
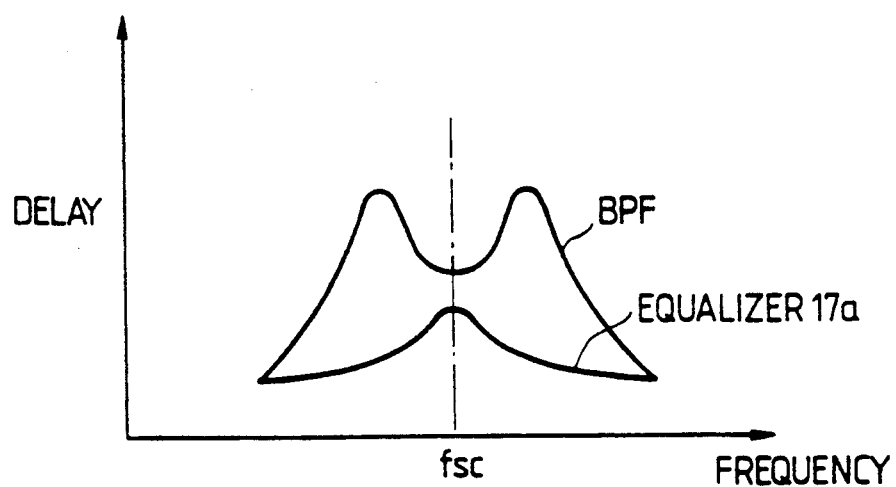
FIG. 5 is a diagram showing the frequency-dependent delay characteristics of a band-pass filter and the first equalizer of FIG. 20.
Figure 6:
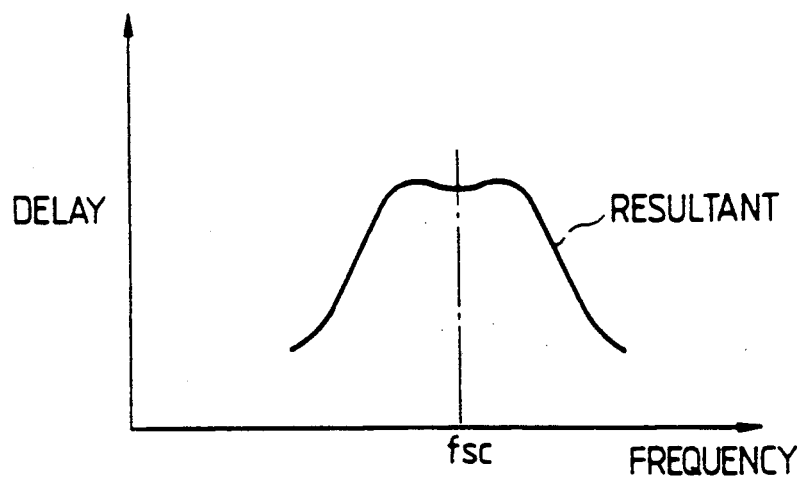
FIG. 6 is a diagram showing the resultant frequency-dependent delay characteristics of the band-pass filter and the first equalizer of FIG. 20.

The first equalizer 17a delays the color signal by a predetermined time, for example, 500 ns, to cancel the signal side-band lag caused by a band-pass filter (BPF) and other devices provided within a stage in front of the chroma difference extractor 90. As shown in FIG. 5, such a BPF causes great delays to side bands of the color subcarrier and small delays to the color subcarrier having a frequency "fsc". The frequency-dependent delay characteristics of the first equalizer 17a is designed to compensate those of the BPF. As shown in FIG. 6, the resultant frequency-dependent delay characteristics of the combination of the BPF and the first equalizer 17a are approximately flat over a wide range extending at and around the color subcarrier frequency "fsc".

Figure 7:
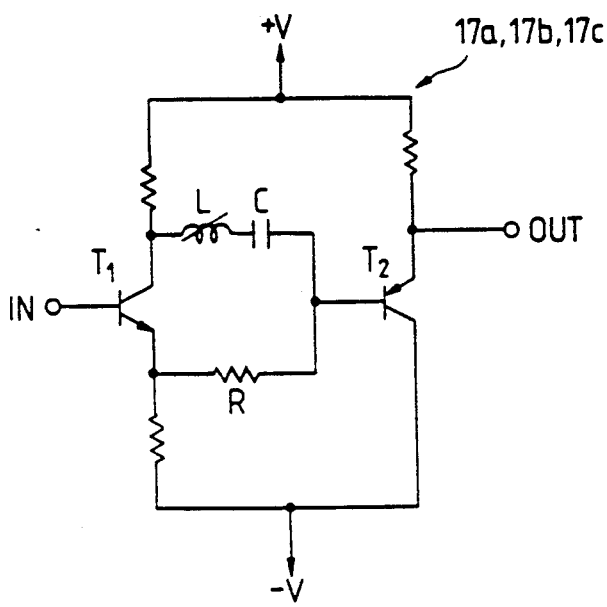
FIG. 7 is a schematic diagram of each of the equalizers of FIG. 20.
Figure 8:
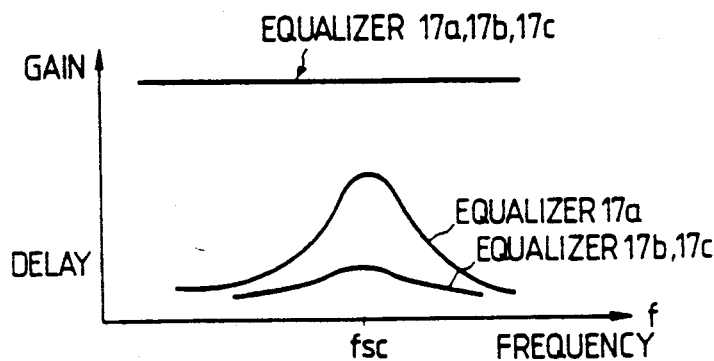
FIG. 8 is a diagram showing the frequency-dependent gain characteristics and the frequency-dependent delay characteristics of each of the equalizers of FIG. 20.
Figure 9:
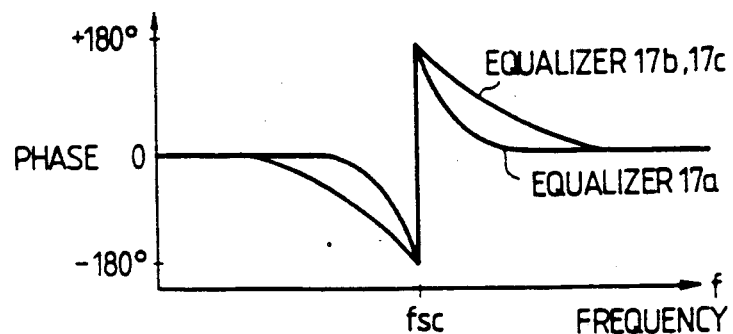
FIG. 9 is a diagram showing the frequency-dependent phase characteristics of each of the equalizers of FIG. 4.

Each of the equalizers 17a-17c has such a known structure as shown in FIG. 7. Specifically, each of the equalizers 17a-17c includes a combination of transistors T1 and T2, an inductor L, a capacitor C, and a resistor R. The inductor L and the capacitor C constitute a resonance network. This resonance network is tuned to the color subcarrier frequency "fsc" by suitably adjusting the inductor L and the capacitor C. As shown in FIG. 8, the gain of each of the equalizers 17a-17c is flat independent of the frequency. As shown in FIG. 8, the signal delay offered by each of the equalizers 17a-17c peaks at the color subcarrier frequency "fsc". As shown in FIG. 9, the signal undergoes a phase shift of 180° at the color subcarrier frequency "fsc" through each of the equalizers 17a–17c.

As shown in FIG. 8, the signal delays offered by the second and third equalizers 17b and 17c are set smaller than the signal delay offered by the first equalizer 17a. This design is based on the following reason. The second and third equalizers 17b and 17c and the subtracter 19b constitute a device generating a signal which is used by the multiplier 20 to enhance the color signal. On the other hand, the first and second equalizers 17a and 17b and the subtracter 19a constitute a chroma edge detector. In order to attain a high sensitivity of this chroma edge detector, the delay quantity of the first equalizer 17 is set great and the signal difference is determined at points adequately distant from each other.

What is claimed is:

1. A picture-quality improving circuit comprising:
   means for generating a chroma edge signal on the basis of a color signal, the chroma edge signal representing a chroma edge;
   means for generating a luminance edge signal on the basis of a luminance signal, the luminance edge signal representing a luminance edge;
   means for detecting a chroma edge signal;
   means for differentiating an output signal from the detecting means;
   means for amplifying an output signal from the differentiating means;
   first adding means for adding an output signal from the amplifying means and the luminance edge signal;
   means for multiplying a chroma edge signal and an output signal from the first adding means; and
   second adding means for adding an output signal from the multiplying means to the color signal to yield an enhanced color signal.

2. A picture-quality improving circuit of claim 1 wherein the chroma-edge-signal generating means comprises first and second subtracters, and a cascade combination of first, second, and third equalizers; the color signal is fed to an input terminal of the first equalizer and a first input terminal of the first subtracter; an output signal from the first equalizer is fed to an input terminal of the second equalizer and a first input terminal of the second subtracter; an output signal from the second equalizer is fed to a second input terminal of the first subtracter, an input terminal of the third equalizer, and the adding means; an output signal from the third equalizer is fed to a second input terminal of the second subtracter; an output signal from the first subtracter is fed to the detecting means; and an output signal from the second subtracter is fed to the multiplying means.

* * * * *